(12) United States Patent
Manapragada et al.

(10) Patent No.: US 7,783,653 B1
(45) Date of Patent: Aug. 24, 2010

(54) FAST SEEK IN STREAMING MEDIA

(75) Inventors: Srinivas Manapragada, Fremont, CA (US); Pritham Shetty, Los Altos, CA (US); Asa Whillock, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1197 days.

(21) Appl. No.: 11/173,985

(22) Filed: Jun. 30, 2005

(51) Int. Cl.
*G06F 7/00* (2006.01)
*G06F 17/30* (2006.01)

(52) U.S. Cl. .................................. 707/758; 707/999.1
(58) Field of Classification Search ................. 707/104, 707/758
See application file for complete search history.

(56) References Cited

U.S. PATENT DOCUMENTS

| | | | | |
|---|---|---|---|---|
| 5,630,005 A * | 5/1997 | Ort | | 386/69 |
| 5,959,690 A | 9/1999 | Toebes, VIII et al. | | |
| 6,397,230 B1 * | 5/2002 | Carmel et al. | | 715/210 |
| 6,535,920 B1 * | 3/2003 | Parry et al. | | 709/231 |
| 6,658,199 B1 | 12/2003 | Hallberg | | |
| 6,721,490 B1 * | 4/2004 | Yao et al. | | 386/69 |
| 6,820,144 B2 * | 11/2004 | Smirnov et al. | | 710/52 |
| 6,941,508 B2 | 9/2005 | Abbott et al. | | |
| 7,106,798 B1 | 9/2006 | Fries et al. | | |
| 7,149,868 B2 * | 12/2006 | Parry et al. | | 711/170 |
| 7,334,078 B2 * | 2/2008 | Parry et al. | | 711/100 |
| 2002/0158878 A1 * | 10/2002 | Smirnov et al. | | 345/545 |
| 2003/0095790 A1 * | 5/2003 | Joshi | | 386/69 |
| 2004/0073936 A1 | 4/2004 | Kurauchi | | |
| 2004/0141722 A1 | 7/2004 | Morishita | | |
| 2004/0170379 A1 * | 9/2004 | Yao et al. | | 386/46 |
| 2004/0244058 A1 | 12/2004 | Carlucci et al. | | |
| 2005/0081244 A1 | 4/2005 | Barrett et al. | | |
| 2009/0089846 A1 | 4/2009 | Wang et al. | | |

OTHER PUBLICATIONS

Le, Rong, Examiner, in U.S. Appl. No. 11/173,957, Office Action dated Nov. 27, 2009, 37 pages to be published by the USPTO.

* cited by examiner

*Primary Examiner*—John E Breene
*Assistant Examiner*—Joshua Bullock
(74) *Attorney, Agent, or Firm*—Fish & Richardson P.C.

(57) ABSTRACT

When a user selects to seek to a point in a non-indexed media file, a search starts for the beginning of the frame. Using a search algorithm, the bytes surrounding the selection point are examined to find data equal to a known frame beginning indicator. Once such a byte is found, a subsequent test is performed on the next byte to determine if it contains a valid frame length. The system examines the byte at this length to determine if it contains a value that points to the frame beginning indicator under examination. If such a pointer does exist, the system concludes that the byte with the value equal to a known frame beginning indicator is likely the byte beginning the frame. Additional tests may be performed on the bytes surrounding this frame to increase the confidence level that it is, in fact, a valid complete frame.

24 Claims, 6 Drawing Sheets

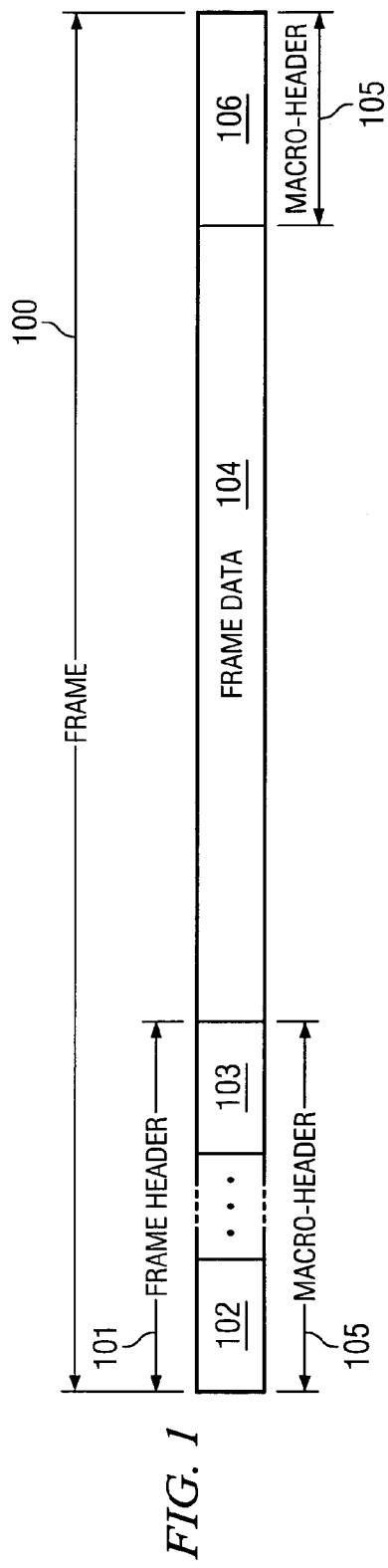
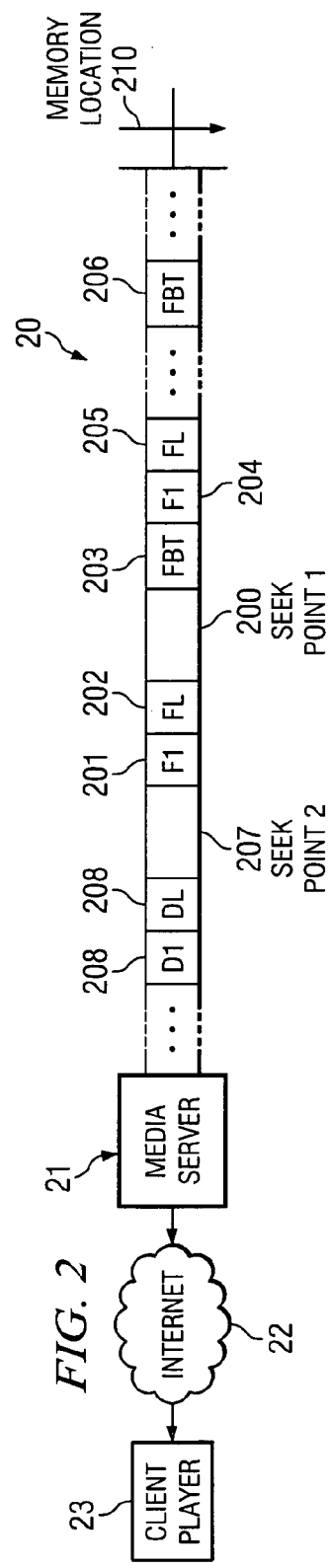
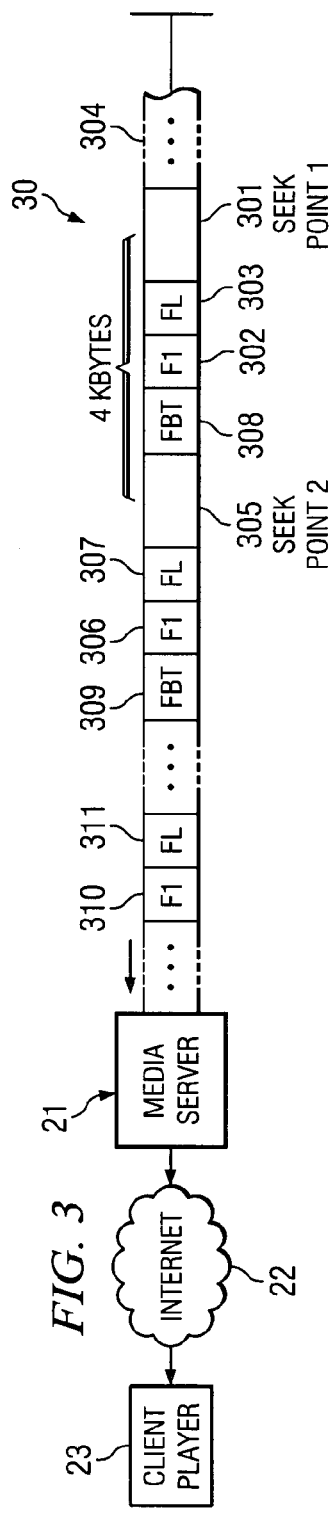
FIG. 1
FIG. 2
FIG. 3

FAST SEEK IN STREAMING MEDIA

CROSS-REFERENCE TO RELATED APPLICATIONS

The present application is related to concurrently-filed, co-pending, commonly-assigned, U.S. patent application Ser. No. 11/173,957, entitled, "ENHANCED SEEK IN STREAMING MEDIA," the disclosure of which is hereby incorporated herein by reference.

TECHNICAL FIELD

The present invention relates, in general, to streaming media, and more specifically, to a fast seek in streaming media.

BACKGROUND OF THE INVENTION

In its infancy, the Internet was a communications system funded and built by researchers for military use. This Internet, originally known as ARPANET, was embraced by the research and academic world as a mechanism for scientists to share and collaborate with other scientists. This collaborative network quickly evolved into the information superhighway of commerce and communication. The Internet explosion was due, in part, to the development of the World Wide Web (WWW) and Web browsers, which facilitated a more graphically-oriented, multimedia system that uses the infrastructure of the Internet to provide information in a graphical, visual, and interactive manner that appeals to a wider audience of consumers seeking instant gratification.

Referring to the Internet as the information superhighway is a metaphor for the mechanism of transporting data from one location to another. As technology has increased, allowing higher and higher bandwidth rates, streaming larger data files, such as audio and video, has become increasingly more available. Streaming larger data files is generally an extension of simply displaying a large data file in a local system. One of the main differences, and a problem with remote streaming applications, is the bandwidth requirements. In a local system, because the data is typically located on a local disk drive or storage system, the access and processing time is minimal. As the client of the file moves further away from the storage location, the longer it will take to view the material. For example, in a local area network (LAN) setting, the data file is still essentially local, but will take a little more time to access and process than in a purely local set up because of the bandwidth attributes and limitations of the LAN. Furthermore, in a wide area network (WAN) or the Internet, because the accessing client is typically located in a remote location from which the bandwidth has some defined limitation, the accessing and processing of the remote data will take much more time than even the LAN application.

Streaming video content over a WAN or the Internet is typically conducted using a particular video format that is then played on a compatible media player running on the client. The video file may generally reside at a centralized location or server. The client system will transmit a request to the server to view the video file, which will cause the server to begin downloading the video file to the client system. When enough of the file has been downloaded, the compatible player will begin displaying the video to the user. Examples of such video formats are MACROMEDIA INC.'s FLASH™ VIDEO (FLV), APPLE COMPUTER CORPORATION's QUICKTIME™ VIDEO, MICROSOFT CORPORATION's WINDOWS™ MEDIA VIDEO (WMV), REALNETWORKS INC.'s REALVIDEO™, and the like.

The video files may be completed files stored in a centralized location or may be reflecting live video captured from a camera and converted into the particular video format before transmission. In viewing video files, it may be desirable for a user to seek to a particular point in the video. Many media players include a progress bar that graphically indicates the running progress of the playing video. Some such players also include slider controls that allow the viewer to change the viewing position of the playing video. This type of control is often referred to as random seeking (i.e., random in the sense that a user is allowed to move the video to any position that he or she desires). When the user moves the slider to the desired position, the media player signals the central server to advance the media stream to the beginning of the frame closest to that seek point.

In the days before electronic video, video was generally played from some sort of tape. The tape was spooled onto a roll and unrolled over one or more reading heads to capture the video and audio data from the tape. In such historic, non-electronic systems, in order to move forward or backward in the video, the tape is linearly fast-forwarded or rewound in order to reach the specific location. Depending on the size or length of the tape, the speed of the machine, and other similar characteristics, the rewind or fast-forward would potentially take a considerable amount of time. However, electronic data is not physically limited to a sequential, linear progression in the same manner that tape is. Therefore, some electronic data files may be accessed in a non-linear fashion.

In general application, there are indexed media files and non-indexed media files. Indexed files include a detailed index, which may be part of the same file or an associated file, that provides information about the content of the media content. Using such an index in a media file may allow the compatible media player to access the desired location without systematically scanning thru the actual media file. Because there is an index, the player would generally look up the location on the index and then jump to that location in the media content. However, such an indexing system requires a great deal of overhead and maintenance to keep current.

An index keeps track of the file contents. If anything in the file changes, the index will be changed also to reflect the change in the media file. Therefore, if a video designer changes or adds any content to the file, the index will be updated. Furthermore, when accessing such an indexed file, a determination would be made whether the index file is stale or too old to be reliable. When the user moves the slider to the desired location, the server would typically perform a linear search of the index and then jump to the specified location in the media file to transmit or download to the requesting client. The time-cost in performing the linear search of the index and jumping to the specified location in the file provides a degree of improvement over a straight linear search of the media content. However, the linear search of an index is still a slow search.

The time cost of generating the index is also fairly high to the cost of generating the index in the first place. Many indexing utilities will automatically generate the index by linearly sequencing through the media content. This linear sequencing typically takes as much time as sequencing through the media content to play it. When the media content is changed, some indexing utilities do not merely change the index, but instead completely regenerate a new index. Thus, in some applications, each time a change is made, considerable time is spent fully generating a new index.

Non-indexed files are intended to have little overhead and maintenance requirements to allow greater flexibility in the creation and editing of the video file. Non-indexed media files basically consist of a stream of frames that make up the media information. Each frame is simply sequential to the previous. This simple structure allows for free splicing and editing of the media file without creating a need to re-order an index, a table of contents, or the like. In general, a non-indexed media file will have each of its frames begin with a header section that identifies the beginning of the frame, the frame length, the codec used, a time stamp, and the like. The order that this administrative information is placed into the frame header depends on the rules of the particular media format that is used. One format may place the frame length in the byte following the frame beginning indicator, while another format places the frame length in the fifth byte of the header. The specific order of such header information is generally not standard across all media formats. Moreover, some formats, such as FLV, add additional macro-header information that includes items such as a back tag pointer. A back tag pointer is a byte or bytes located at the end of the frame that points to the beginning of that frame. This macro-header information envelopes the frame payload. All of this administrative information allows the transmitting server and the receiving player to decipher, control, and, for the receiving player, play the intended media stream, but is not so extensive that a developer would not be able to freely edit the frames in the media file.

To seek through a non-indexed media file, the server typically performs a linear scan of each frame of the file in sequence to arrive at the desired frame. This linear scan does not generally take as long as simply playing the file in real-time, but may only save a constant order of time. Thus, a video file that has millions of frames, or that lasts for an hour or more, may take 15, 20, or even 30 minutes or more just to seek to the middle or later part of the video file. In terms of viewing video over the Internet, this delay would be unacceptable to most users.

One method that has been used to improve the performance in seeking through non-indexed media files is to actually generate an index or table of contents on the storing server. By generating such an index or table of contents, the seek-time performance may be improved slightly over that of a regular non-indexed file. However, again, the overhead of creating and maintaining the index makes this minor improvement less appealing. Moreover, adding an index to a non-indexed media file defeats the purpose and benefits of having no index.

BRIEF SUMMARY OF THE INVENTION

The present invention is directed to a system and method for seeking to a point in a streaming media file. In order to begin play from that seek point in the media stream, the server searches for the beginning of the frame for the first complete frame nearest to the seek point. Using a search algorithm, the bytes surrounding the selected seek point are examined to find data representing a known frame beginning indicator. When a byte is found matching such a value, the server begins an assumption that this byte is the frame beginning indicator. At this point in the examination, however, the confidence level in this assumption is not very high.

The server that processes and transmits the media stream is preprogrammed with the structure of the media format that is used, and, therefore, knows the structure of the frame header or macro-header/envelope. A subsequent test is performed by examining the remaining bytes of the header for the length of the frame. The position of the length byte to be tested will be known by the server based on the structure of the particular media format. If the length byte is determined to be a valid frame length, the server will increase the confidence level that the beginning byte under examination is the valid frame beginning. If, however, the length actually points to a location that it clearly outside of the size of the frame, the server removes the assumption regarding the byte that equaled the known frame beginning indicator and continues searching for the correct beginning byte.

If the media format includes macro-header/envelope data, such as a back tag, additional representative embodiments of the present invention allow the server to examine the byte located at the valid length to determine if it is, in fact, the end of the frame. The server moves to the media file at the length obtained from the length byte. If the data at this presumed end byte location points to the beginning byte under examination, the server further increases the confidence level that it has the exact location of the frame beginning and the frame end. In this described embodiment, the server would begin streaming the media file at this beginning frame byte to the client player. If, however, the data at the valid length does not point to the byte under examination, the server removes the assumption regarding the byte that equaled the known frame beginning indicator and continues searching for the correct beginning byte.

In additional representative embodiments of the present invention, further testing may be completed on the bytes surrounding what the server believes to be the complete frame nearest to the seek point. The additional tests serve to either increase the confidence level of the assumption that the byte containing the data equal to the known frame beginning indicator is, in fact, the frame beginning byte or verify that this byte is only part of the frame data payload.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 1 is a block diagram illustrating a frame in a typical media file;

FIG. 2 is a block diagram illustrating a media server configured according to one embodiment of the present invention;

FIG. 3 is a block diagram illustrating a media server configured according to one embodiment of the present invention processing an incomplete media stream;

DETAILED DESCRIPTION OF THE INVENTION

Figure 4:
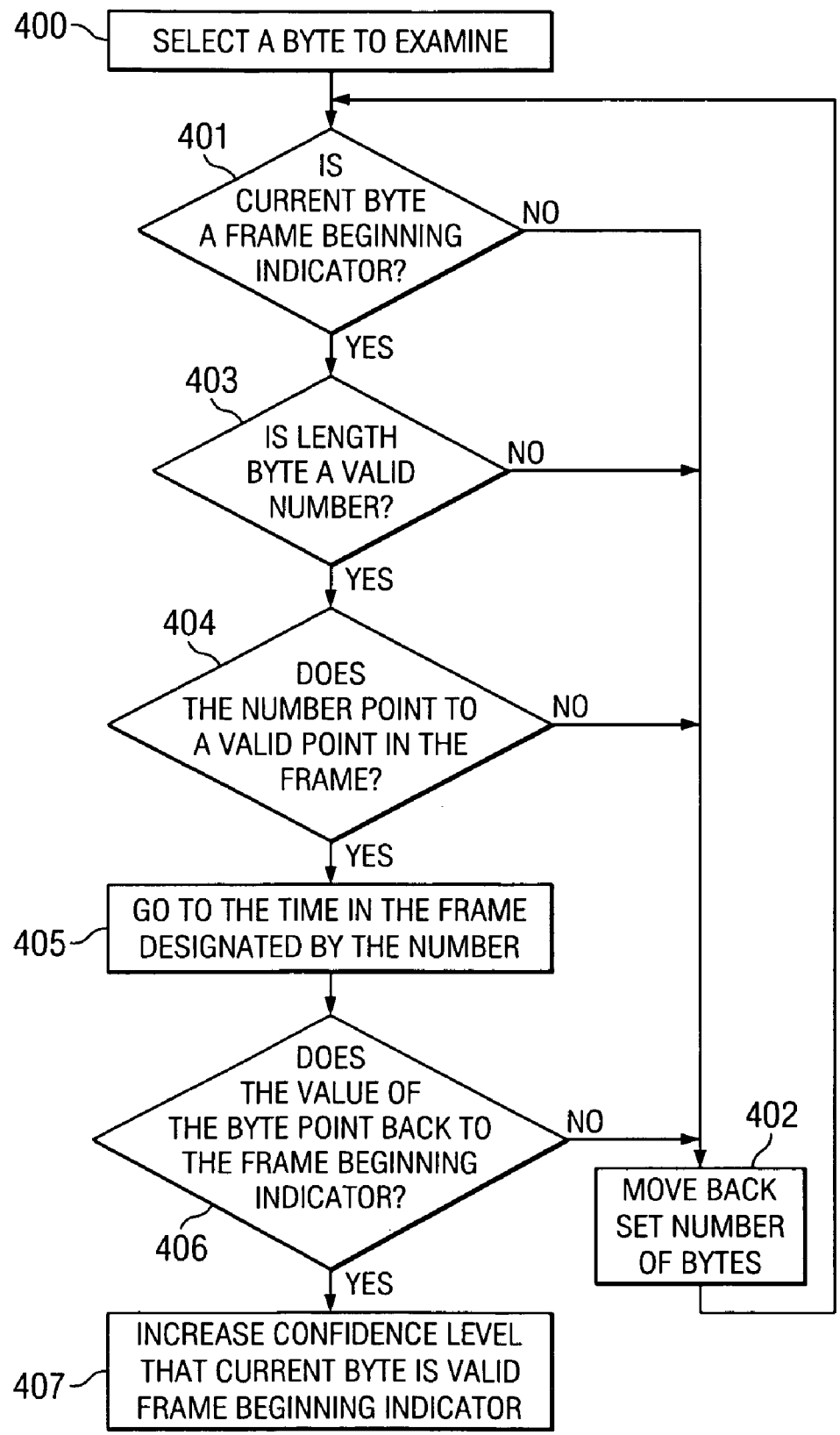
FIG. 4 is a flowchart illustrating example steps executed in implementing one embodiment of the present invention.

FIG. 1 is a block diagram illustrating frame 100 in a typical media file. Frame 100 begins with frame header 101. Frame header 101 may include one or more bytes of administrative data, such as beginning tag 102, which is typically a value of 8, 9, 12, or 20, but which may be any other value defined as a frame beginning indicator. Frame header 101 may also include a time stamp, a codec version, a frame length, and the like, in subsequent bytes. Frame length 103 includes a length value that, when added to beginning tag 102 location will define the entire length of frame 100. The payload of frame 100 is carried in frame data section 104. When frame 100 is a frame in a typical media file, the data contained therein may be any value because it is usually a binary file format. Thus, some bytes of payload data may represent the same value as the frame beginning indicator of beginning tag 102 depending on the value of the media represented at that point. Frame 100 is also a type that includes macro-header/envelope data 105, such as back tag 106, that is the final byte in frame 100. Back tag 106 contains a pointer value that points to the beginning of frame 100.

FIG. 2 is a block diagram illustrating media server 21 configured according to one embodiment of the present invention. Media stream 20 is transmitted to client player 23 in a stream of frames from media server 21, via Internet 22. In viewing media stream 20, the user chooses to seek to seek point 1-200. This data is then transmitted to media server 21 to process on media stream 20. Seek point 1-200 is in the middle of one of the frames in media stream 20. Media server 21 cannot simply begin playing the media file in the middle of a particular frame. The frame data in a frame gives the instructions for how to render the visual display. If some of the rendering instructions for the frame were found prior to seek point 1-200, then the media stream would not display properly on client player 23. Therefore, media server 21 operates according to one embodiment of the present invention to locate the beginning of the frame that contains seek point 1-200.

Media server 21 begins by checking the current byte at seek point 1-200. A probability exists that seek point 1-200 falls squarely on a frame beginning indicator. The value of the byte is checked against the known frame beginning indicators. For example, in instances where frame beginning indicators are either 8, 9, 12, or 20, the byte at seek point 1-200 is compared against 8, 9, 12, and 20. If the value of the byte at seek point 1-200 equals the known frame beginning indicators, media server 21 will move to the next test to increase the confidence level that this byte is, in fact, the frame beginning indicator. If the value of the byte at seek point 1-200 is not equal to one of the known frame beginning indicators, media server 21 will begin to execute a search algorithm to find a byte that has a value equal to one of the known frame beginning indicators.

It should be noted that any various type of search algorithm may be used to find the frame beginning indicator in media stream 20. Examples of search algorithms that may be used are a binary search, an interpolation search, a quantum search, such as a Grover's Algorithm search, or any other type of search that does not simply comprise sequentially searching each individual byte in media stream 20.

Once a byte that has a value equal to a known frame beginning indicator is found, F1-201, media server 21 begins the second test. If a particular byte is, in fact, the frame beginning indicator, the following byte will be a frame length. Therefore, media server 21 checks the value of the next byte, FL-202, to determine whether it represents a valid number. If it is a valid number, that number is checked to determine whether a length of that value will be a valid length. A valid length would be a length within the known length of media stream 20. If the length were to point to memory location 210, which is clearly outside of the valid length of media stream 20, then media server 21 will know that the next byte is not the frame length, and, therefore, that the byte under consideration is not the frame beginning indicator.

However, the value of FL-202 produces a valid length, the confidence level that F1-201 is the frame beginning indicator rises and media server 21 proceeds to the next test. Using the length value from FL-202, media server 21 jumps to the point in media stream 20 that corresponds to the length, FBT-203. The value at FBT-203 is checked to determine whether or not is points back to F1-201. If the value at FBT-203 does not point back to F1-201, then media server 21 determines that F1-201 is not a frame beginning indicator. However, in the example illustrated in FIG. 2, the value of FBT-203 does point back to F1-201. Thus, the confidence level of media server 21 that F1-201 is, in fact, the frame beginning indicator rises, yet again.

At this point, media server 21 may cease the tests in determining whether F1-201 is the frame beginning indicator of the frame that contains seek point 1-200. However, a probability still exists that F1-201, FL-202, and FBT-203 have randomly and coincidentally produced a false positive with regard to F1-201. Therefore, a further set of tests may be conducted to increase the confidence level to an even higher degree.

When FBT-203 is a back tag for a frame, then the next byte, F1-204 will be a frame beginning indicator for the next frame. Thus, media server 21 moves to F1-204 after FBT-203 to check its value against the known frame beginning indicator values. If F1-204 does not equal a known frame beginning indicator, media server 21 will determine that F1-201 is not a frame beginning indicator. However, in the described example, F1-204 equals one of the known values of a frame beginning indicator. Media server 21, thereafter, moves to FL-205 to determine whether is contains a value that is a valid number and length. As with the previous test with regard to FL-202 and FBT-203, Media server 21 determines that FL-202 is a valid length and goes to that length, at FBT-206. It will then check the value at FBT-206 to confirm that it points back to F1-204. In the example shown in FIG. 2, media server 21 confirms that FBT-206 contains a value that points back to F1-204, and therefore, determines that F1-201 is the frame beginning indicator for the frame containing seek point 1-200. Media server 21 may now transmit the portion of media stream 20, beginning at F1-201 to client player 23 over Internet 22 to begin playing media stream 20 at the seeked-to point.

In a separate operation, the user selects to play media stream 20 from seek point 2-207. As media server 21 performs the search for the frame beginning indicator for the frame containing seek point 2-207, it finds that D1-208 holds a value that is equal to the known frame beginning indicators. Media server 21 continues to the next byte, DL-209, to test whether its value is a valid number and length. Media server 21 determines that DL-209 has a valid number, but that the length of that value points to memory location 210. Therefore, media server 21 notes that D1-208 is not a frame beginning indicator, and continues the search algorithm to find the actual beginning of the frame.

FIG. 3 is a block diagram illustrating media server 21 configured according to one embodiment of the present invention processing an incomplete media stream. In the various embodiments of the present invention, media streams may be complete, as shown in media stream 20 (FIG. 2), or incomplete, as shown in media stream 30. An incomplete media stream may result from a partial file or may be a live recording that has not been completed. When the user seeks to a point in the middle of a broken or incomplete frame, media server 21 will move to the preceding frame to begin playing.

For example, if a user selects seek point 1-301, media server 21 begins the search algorithm to find the beginning of the frame. When media server 21 discovers that F1-302 contains a value equal to a known frame beginning indicator, it progresses to byte FL-303 to analyze the number/length. Here, the length is determined to be valid, but when media server 21 attempts to go to the location pointed to by the length, it discovers that the frame of media stream 30 is incomplete. At that determination, media server 21 jumps a set amount toward the beginning of media stream 30. In the described example, media server 21 jumps 4 kilobits to seek point 2-305.

At seek point 2-305, media server 21 begins the search algorithm again to find the beginning of the frame. When it discovers that F1-306 contains a value equal to a known frame beginning indicator, it progresses to byte FL-307 to analyze the number/length. In this analysis, media server 21 determines that the value at FL-307 is a valid length and moves that amount to FBT-308. Media server 21 then tests the value of FBT-308 to determine if it is a valid back tag that points to F1-306. In the described example, the value of the byte at FBT-308 does point back to F1-306. Therefore, media server 21 sets a higher confidence that the byte at F1-306 is the frame beginning indicator for the first complete frame nearest to seek point 2-305.

Once the confidence level has reached this point for media server 21, it may cease testing and proceed under the assumption that F1-306 is the frame beginning indicator. Depending on the level of confidence that a system designer would like to provide, additional and/or alternative systems may be designed to result in increased confidence. Such systems may continue testing. Using FIG. 3 as a further example of such additional and/or alternative embodiment, because F1-306 is believed to be the frame beginning indicator, media server 21 estimates that the byte prior to F1-306 will be the back tag of the preceding frame. Media server 21 moves to FBT-309 to analyze its contents. Media server 21 continues the testing to verify F1-310 as a frame beginning indicator and F1-311 as a valid length that points back toward FBT-309. With this secondary test completed, media server 21 further increases the confidence level that byte F1-306 is, indeed, the frame beginning indicator for the frame containing seek point 2-305. Media server 21 then transmits media stream 30, beginning at F1-306, to client player 23 over Internet 22 for beginning playback at a point nearest to seek point 1-301.

FIG. 4 is a flowchart illustrating example steps executed in implementing one embodiment of the present invention. In step 400, a byte is selected for examination. Typically, the byte is the selection point entered by a user viewing the streaming file. However, other means may be used to obtain this byte within the stream. In step 401, a determination is made whether the current byte is a frame beginning indicator. Depending on the transport protocol or system being used, there is typically a byte code that signals the beginning of the frame. The code may be any number of different values, but is usually a defined number of possible codes. The example described above noted possible frame beginning codes of 8, 9, 12, or 20. If the determination of step 401 fails, the system moves a set number of bytes, in step 402, to examine a new byte. The determination of how far to move back or forward is made depending on the particular search algorithm being used.

If the byte under examination does equal the value of a frame beginning indicator, as determined in step 401, another determination is made, in step 403, whether the length byte is a valid number. The length byte is generally found in a set position relative to the frame beginning indicator, depending on the media format being used. Therefore, the length byte should be a valid number. If the determination of step 403 concludes that the length byte value is not a valid number, the system moves along, again a set number of bytes, in step 402, to examine a new byte. At this point, even though the byte under examination equaled the value of a frame beginning indicator, because the length byte was not a valid number, and, thus, not a valid length, the system determines that the byte under examination is, in fact, not a frame beginning indicator.

If the length byte is determined to be a valid number in step 403, another determination is made, in step 404, whether the number is a valid length within the frame. Checking only for a valid number will not suffice when checking for the length of the frame in the length byte. If the length would end up pointing to a location in the stream that was known to be well outside of the file or frame length, then that number would not represent a valid frame length. Therefore, the determination, in step 404, decides whether the value points to a valid location on the media stream. If not, then the system moves to a new byte to test as the frame beginning indicator, in step 402. If, however, the length is valid, the system moves to that length position in the media stream in step 405.

In the embodiment described in FIG. 4, the media format includes macro-header/envelope data in the form of a back tag. At the length designated by the length byte, a determination is made, in step 406, whether the content of that last byte points back to the byte that is being considered for the frame beginning indicator. If the byte value does not point back to the original byte under examination, the system moves to another byte, in step 402, start testing over again. If this turns out to be the result, then it would have been merely coincidental that the first byte to be tested equaled the value of a frame beginning indicator and the second byte happened to be a valid length within a reasonable time setting of the frame. However, because the last tested byte did not contain a value that pointed back to the original byte under test, it could not be a back tag, and therefore, the original byte could not be an actual frame beginning indicator.

If the system determines that the last byte value does, in fact, point back to the original byte being considered, then, in step 407, the confidence level is increased for the system that the byte under test is, in fact, the beginning of the first complete frame nearest to the user's seek point. Depending on the configuration of the system, the testing may stop at this confidence level, after which the system would begin transmitting the media stream to the client player beginning at the resulting frame beginning indicator. Additional and/or alternative embodiments of the present invention may, instead, continue testing in order to increase the confidence level that the byte under examination is the frame beginning indicator.

Figure 5A:
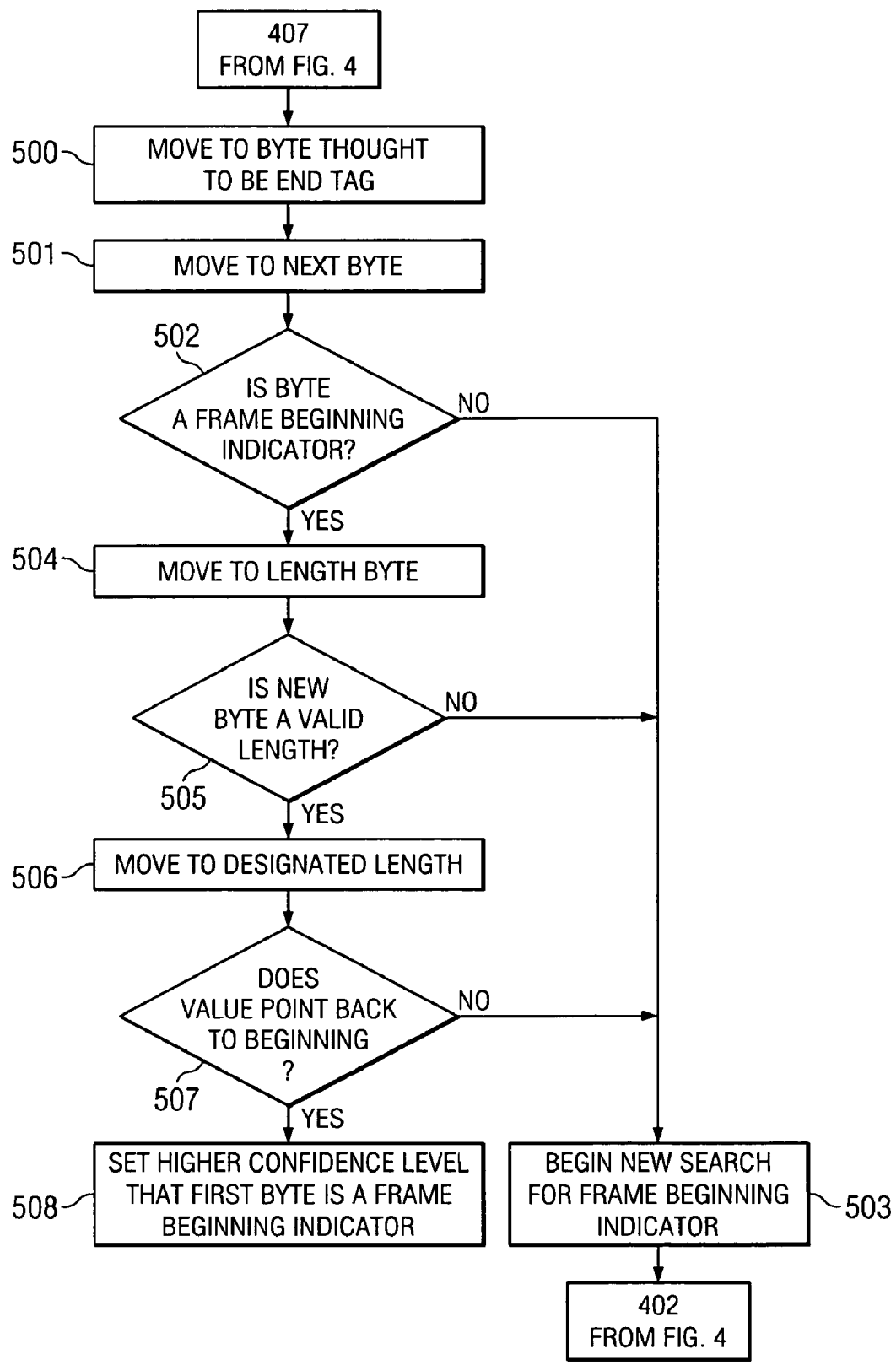
FIG. 5A is a flowchart illustrating example steps executed in implementing one embodiment of the present invention.

FIG. 5A is a flowchart illustrating example steps executed in implementing one embodiment of the present invention. As described with respect to FIG. 4, after making the first set of tests to determine whether the byte under examination is the frame beginning indicator of the first complete frame closest to the seek point, the system described in FIG. 4 stopped testing. The additional and/or alternative system shown in FIG. 5A would continue testing to increase the confidence level that the byte under examination is the frame beginning indicator. After the confidence level has been set in step 407 (FIG. 4), the system moves, in step 500, to the byte that is thought to be the end tag of the frame started by the byte under examination. In step 501, the system moves to the next byte. A determination is made, in step 502, whether that byte is a frame beginning indicator. If not, then, in step 503, a new search for a frame beginning indicator for the first complete frame closest to the seek point is begun. The system then moves to another byte, in step 402, for examination. Because this determination was made that the next byte after the byte that was believed to be the back tag of the frame, the bytes that were originally tested to be the frame beginning indicator, the frame length, and the back tag all each coincidentally matched to their expected values, when, in fact, those values were simply random.

If, however, the determination from step 502 finds that the new byte is equal to a frame beginning indicator, the system moves to the length byte in step 504. In step 505, a determination is made whether the value of the length byte is a valid length. Both the number and length are examined and verified, as in FIG. 4. If the value is determined not to be valid, a new search is started, in step 503, with the system moving to a new byte in step 402. If the length is determined to be valid, then the system moves to that length in step 506.

The byte located at the length value from steps 505 and 506, is now believed to be a back tag. In step 507, a determination is made whether the value of this new byte points back to the byte believed to be the beginning indicator of the next frame. If the determination fails, a new search is started, in step 503, with the system moving to a new byte in step 402. Otherwise, the confidence level is set even higher that the original byte is the frame beginning indicator of the first complete frame nearest to the seek point. Here again, the described embodiment of the present invention may cease testing and begin to play the media stream from the beginning point of the first complete frame nearest to the seek point. Whereas additional or alternative embodiments of the present invention may select to continue testing.

Figure 5B:
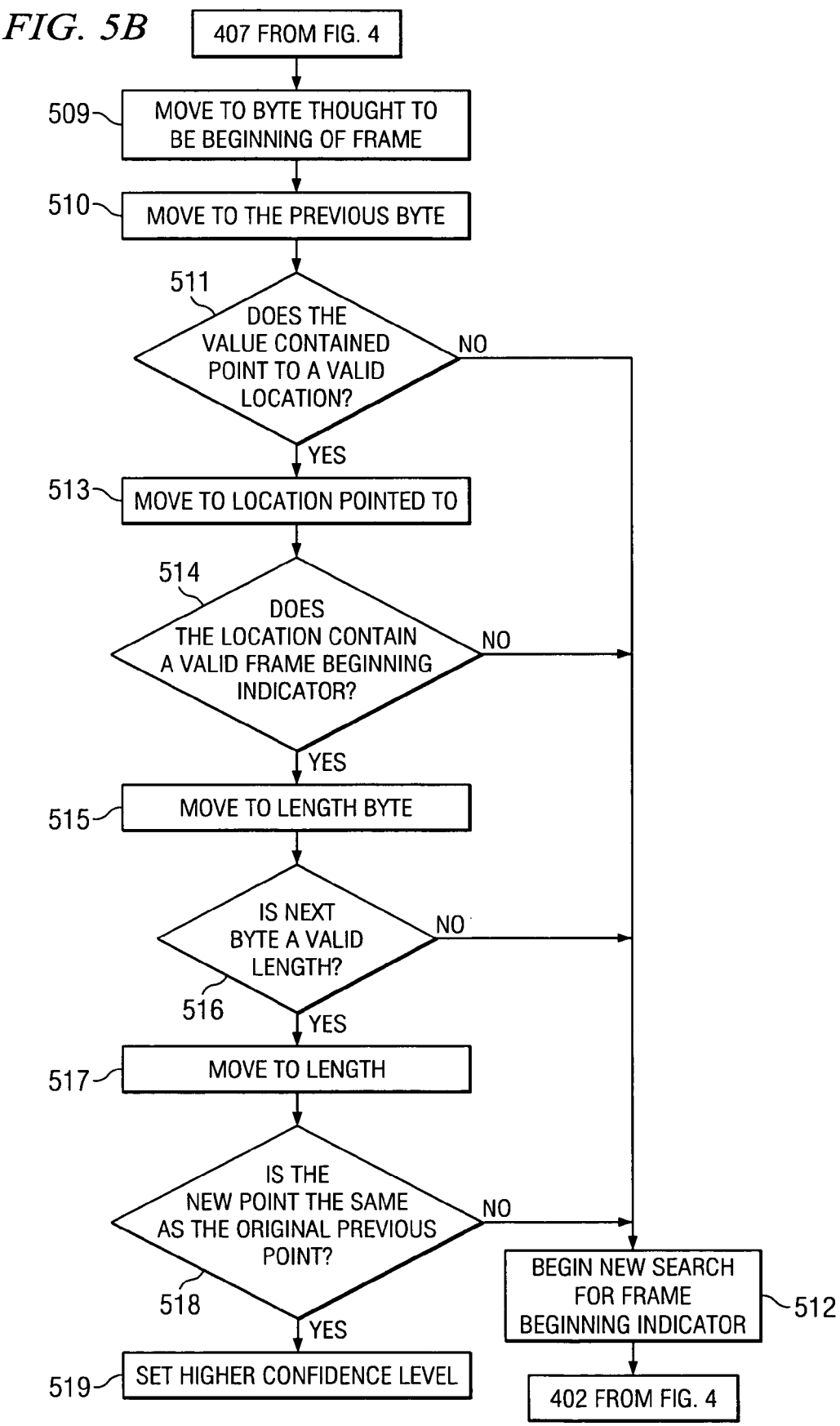
FIG. 5B is a flowchart illustrating example steps executed in implementing one embodiment of the present invention.

FIG. 5B is a flowchart illustrating example steps executed in implementing one embodiment of the present invention. While the embodiment described in FIG. 5A illustrated a test in which the subsequent frame is tested. The example illustrated in FIG. 5B shows testing the previous frame. For example, if the frame at the seek point is the last complete frame, the system would not be able to test the subsequent frame. The method begins similarly to the example illustrated in FIG. 5A. When the confidence level has been set in the first test at step 407, the system moves, in step 509, to the byte thought to be the beginning frame indicator of the frame/byte under examination. In step 510, the system moves to the previous byte. In step 511, a determination is made whether the value contained in this byte points to a valid location within the frame. If not, then a new search is started in step 512, and the system moves to a new byte for testing in step 402.

If, however, the value of the byte does point to a valid location, the system moves to that location in step 513. In step 514, a determination is made whether the byte at this new location contains a valid frame beginning indicator. If not, then again, a new search is started in step 512, and the system moves on to a new byte for testing in step 402. On the determination that the byte value is equal to a frame beginning indicator, the system moves to the length byte in step 515. A determination is made, in step 516, whether this length byte is a valid length. If not, the search is started over, in step 512, and the system moves to a new byte for testing in step 402.

If the determination from step 516 results in a valid length, the system moves to that length in step 517. A determination is then made, in step 518, whether this new byte is the same byte that was the start of the new test, i.e., whether the new byte is a valid back tag for the previous frame. If not, a new search is started in step 512, and the system moves to a new byte for testing in step 402. If the determination of step 518 results in a finding that the byte is the back tag of the previous frame, then the confidence level is set higher, in step 519, that the originally tested byte is the frame beginning indicator of the first complete frame nearest to the seek point.

Figure 6:
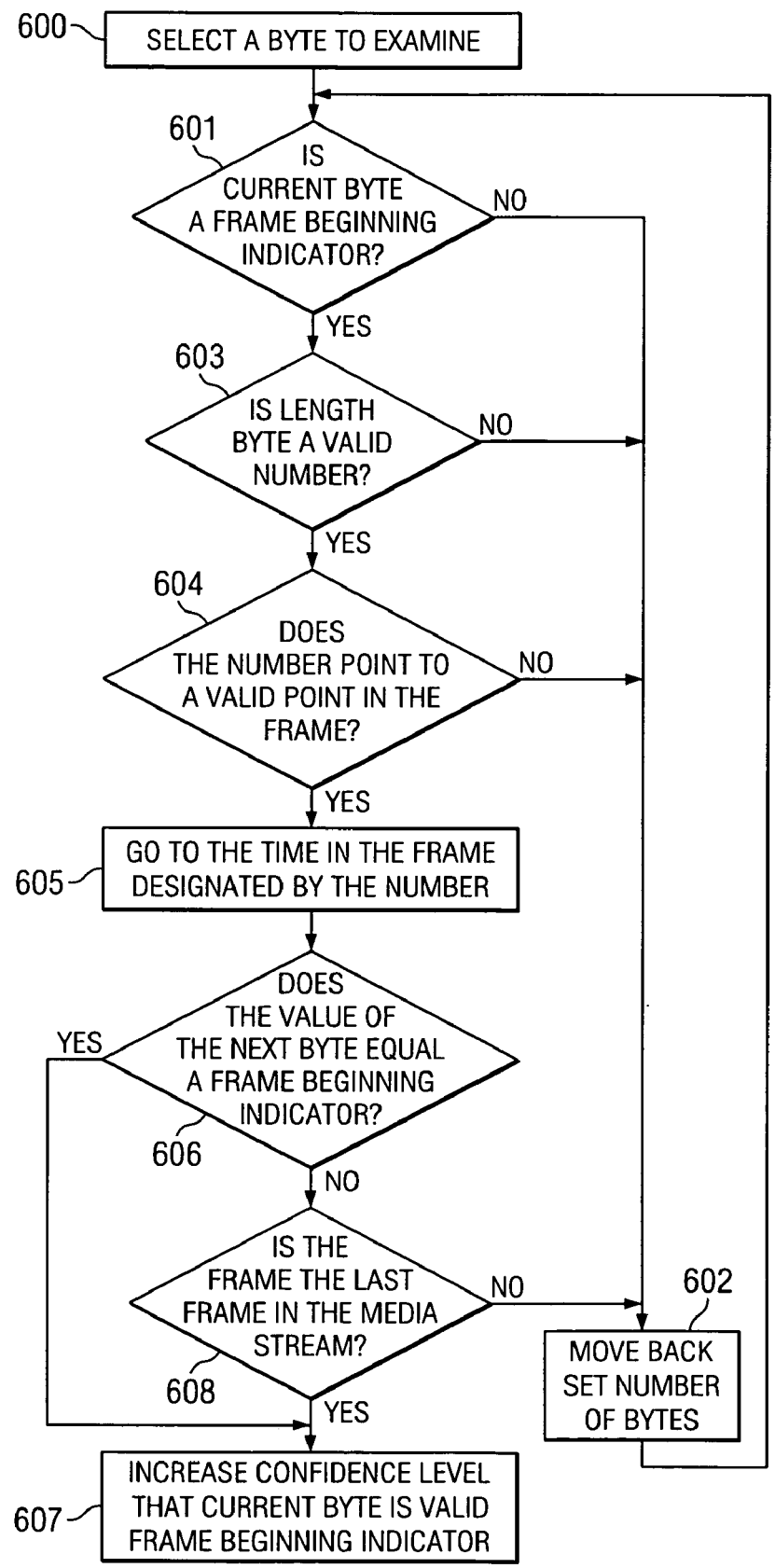
FIG. 6 is a flowchart illustrating example steps executed in implementing one embodiment of the present invention.

FIG. 6 is a flowchart illustrating example steps executed in implementing one embodiment of the present invention. In step 600, a byte is selected for examination. A determination is made, in step 602, whether the current byte is equal to a known frame beginning indicator. If the determination of step 601 fails, the system moves a set number of bytes, in step 602, to examine a new byte or a new seek point. The determination of how far to move back or forward is made depending on the particular search algorithm being used. If the byte under examination equals the value of a frame beginning indicator, another determination is made, in step 603, whether the length byte is a valid number. The length byte is generally found in a set position relative to the frame beginning indicator, depending on the media format being used. Therefore, the length byte should be a valid number. If the determination of step 603 concludes that the length byte value is not a valid number, the system moves along, again a set number of bytes, in step 602, to examine a new byte. At this point, even though the byte under examination equaled the value of a frame beginning indicator, because the length byte was not a valid number, and, thus, not a valid length, the system determines that the byte under examination is, in fact, not a frame beginning indicator.

If the length byte is determined to be a valid number in step 603, another determination is made, in step 604, whether the number is a valid length within the frame. The determination, in step 604, decides whether the value points to a valid location on the media stream. If not, then the system moves to a new byte to test as the frame beginning indicator, in step 602. If, however, the length is valid, the system moves to that length position in the media stream in step 605.

In the embodiment described in FIG. 6, unlike the embodiment described in FIG. 4, the media format does not include macro-header/envelope information. Therefore, once the first byte has been found containing the frame beginning indicator value and the length has been validated or verified, the system may stop the process and proceed with a reasonable assumption that the actual frame beginning has been found. However, an additional test may be performed to increase the confidence level of that assumption. In step 606, a determination is made whether the value of the next byte, i.e., the byte just after the assumed last byte of the frame containing the seek point, contains data that is equal to one of the known frame beginning indicator values. If so, then, in step 607, the confidence level is increased. If the byte does not equal a known frame beginning indicator, then, in step 608, an additional determination is made whether the frame under consideration is the last frame in the media stream. If the next byte is not a frame beginning indicator, the previous byte could still be part of a valid frame, if it is the last frame in the stream. If so, then the confidence level is increased, in step 607. Otherwise, the system moves to a new byte to test as the frame beginning indicator, in step 602.

The program or code segments making up the various embodiments of the present invention may be stored in a computer readable medium. The "computer readable medium" may include any medium that can store information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, and the like. The code segments may be downloaded via computer networks such as the Internet, Intranet, and the like.

Figure 7:
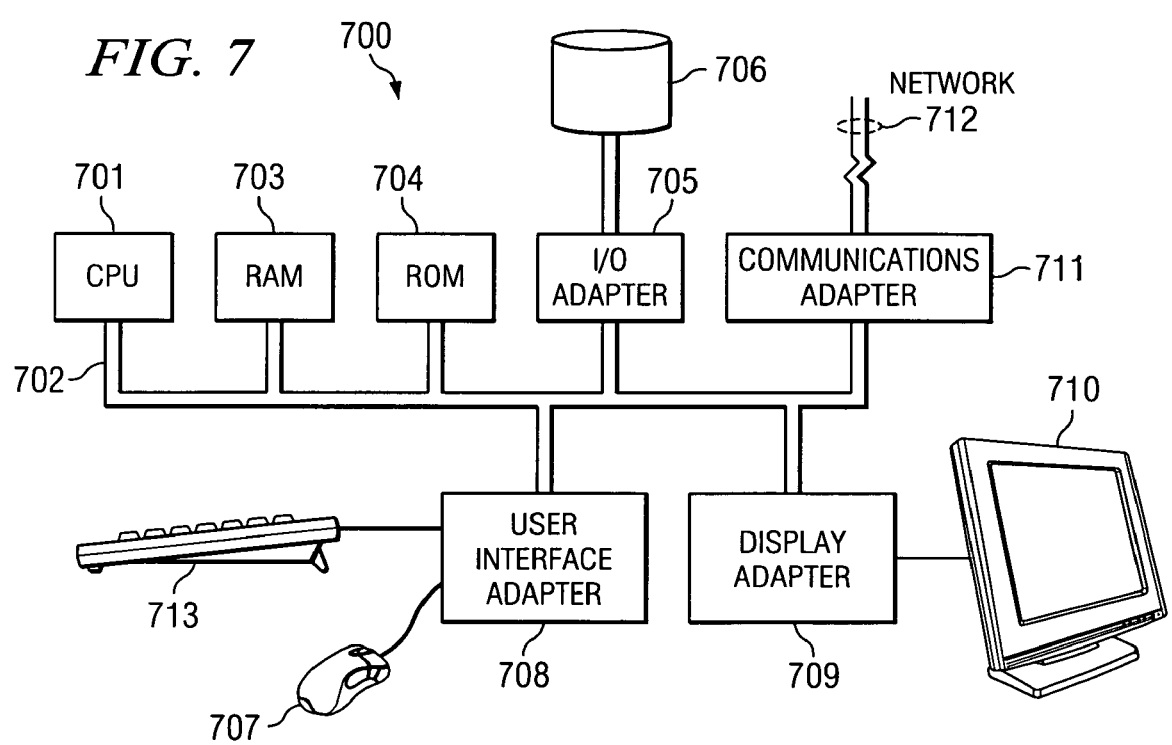
FIG. 7 illustrates a computer system adapted to use embodiments of the present invention

FIG. 7 illustrates computer system 700 adapted to use embodiments of the present invention, e.g. storing and/or executing software associated with the embodiments. Central processing unit (CPU) 701 is coupled to system bus 702. The CPU 701 may be any general purpose CPU. However, embodiments of the present invention are not restricted by the architecture of CPU 701 as long as CPU 701 supports the inventive operations as described herein. Bus 702 is coupled to random access memory (RAM) 703, which may be SRAM, DRAM, or SDRAM. ROM 704 is also coupled to bus 702, which may be PROM, EPROM, or EEPROM. RAM 703 and ROM 704 hold user and system data and programs as is well known in the art.

Bus 702 is also coupled to input/output (I/O) controller card 705, communications adapter card 711, user interface card 708, and display card 709. The I/O adapter card 705 connects storage devices 706, such as one or more of a hard drive, a CD drive, a floppy disk drive, a tape drive, to computer system 700. The I/O adapter 705 is also connected to a printer (not shown), which would allow the system to print paper copies of information such as documents, photographs, articles, and the like. Note that the printer may be a printer (e.g., dot matrix, laser, and the like), a fax machine, scanner, or a copier machine. Communications card 711 is adapted to couple the computer system 700 to a network 712, which may be one or more of a telephone network, a local (LAN) and/or a wide-area (WAN) network, an Ethernet network, and/or the Internet network. User interface card 708 couples user input devices, such as keyboard 713, pointing device 707, and the like, to the computer system 700. The display card 709 is driven by CPU 701 to control the display on display device 710.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for seeking to a point in a media stream comprising:
    testing a value at a seek point on said media stream for a frame beginning indicator;
    responsive to finding a frame beginning indicator value, verifying content of a length byte for a valid frame length, wherein said length byte is located in relation to said seek point;
    responsive to verifying said valid frame length, assuming said seek point begins a frame;
    responsive to a failure of one of said testing and said verifying:
        selecting a new seek point on the media stream using a search algorithm that is faster than sequentially searching each individual byte in the media stream, wherein the search algorithm comprises one of a binary search, an interpolation search and a quantum search;
        moving to the new seek point on said media stream; and
        repeating said testing, said verifying, and said assuming for said new seek point;
    refocusing to a byte located at the valid frame length from one of the seek point and the new seek point;
    evaluating a byte content as a pointer;
    responsive to the pointer pointing to one of the seek point and the new seek point:
        increasing a confidence level of said assuming; and then
        transmitting the media stream from the one of the seek point and the new seek point; and
    responsive to a failure of the pointer pointing to one of the seek point and the new seek point:
        performing said selecting of a new seek point on the media stream;
        moving to the new seek point; and
        repeating of said testing, said verifying, and said assuming for the new seek point.

2. The method of claim 1 further comprising:
    responsive to verifying said valid frame length, refocusing to an end byte located at said valid frame length from one of said seek point and said new seek point;
    analyzing a value of a first byte for said frame beginning indicator, wherein said first byte is located one byte after said end byte;
    responsive to finding said frame beginning indicator value, confirming validity of another length byte content;
    responsive to said confirming, increasing a confidence level of said assuming prior to said transmitting of the media stream from the one of the seek point and the new seek point; and
    responsive to a failure of one of said analyzing and said confirming:
        performing said selecting of a new seek point on the media stream;
        moving to said new seek point on said media stream; and
        repeating said testing, said verifying, and said assuming for said new seek point.

3. The method of claim 2 further comprising:
    refocusing to a byte located at said confirmed another length byte content from one of said seek point and said new seek point;
    evaluating said byte content as a pointer; and
    increasing a confidence level of said assuming, responsive to said pointer pointing to one of said seek point and said new seek point, and prior to said transmitting of the media stream from the one of the seek point and the new seek point.

4. The method of claim 3 further comprising:
responsive to a failure of said pointer pointing to one of said seek point and said new seek point, performing said selecting of a new seek point on the media stream, said moving and said repeating said testing, said verifying, and said assuming for said new seek point.

5. The method of claim 1 further comprising:
receiving said seek point from a user viewing said media stream.

6. The method of claim 1, wherein said quantum search comprises a Grover's algorithm search.

7. The method of claim 1 further comprising:
discovering said media stream is incomplete at said valid frame length;
responsive to said discovering, performing said selecting of a new seek point on the media stream, said moving and said repeating said testing, said verifying, and said assuming for said new seek point.

8. The method of claim 1 further comprising:
refocusing to a byte located at said valid frame length from one of said seek point and said new seek point;
evaluating a content of a next byte after said byte; and
increasing a confidence level of said assuming, responsive to said next byte equaling said frame beginning indicator value, and prior to said transmitting of the media stream from the one of the seek point and the new seek point.

9. A computer program product having a computer readable medium with computer program logic recorded thereon for seeking to a point in a media stream, said computer program product comprising:
code for testing a value at a seek point on said media stream for a frame beginning indicator;
code, executable responsive to finding a frame beginning indicator value, for verifying content of a length byte for a valid frame length, wherein said length byte is located in relation to said seek point;
code, executable responsive to verification of said valid frame length, for assuming said seek point begins a frame;
code, executable responsive to a failure of one of said testing and said verification:
for selecting a new seek point on the media stream using a search algorithm that is faster than sequentially searching each individual byte in the media stream, wherein the search algorithm comprises one of a binary search, an interpolation search and a quantum search;
for moving to the new seek point on said media stream; and
for re-executing said code for testing, said code for verifying, and said code for assuming for said new seek point;
code for focusing on a byte located at the valid frame length from one of the seek point and the new seek point;
code for evaluating a byte content as a pointer; and
code, executable responsive to the pointer pointing to one of the seek point and the new seek point:
for increasing a confidence level of the code for assuming; and
for subsequently transmitting the media stream from the one of the seek point and the new seek point; and
code, executable responsive to a failure of the pointer pointing to one of the seek point and the new seek point:
for executing the code for said selecting of a new seek point on the media stream and for said moving to the new seek point and
for executing the code for testing, the code for verifying, and the code for assuming for the new seek point.

10. The computer program product of claim 9 further comprising:
code, executable responsive to verification of said valid frame length, for focusing on an end byte located at said valid frame length from one of said seek point and said new seek point;
code for analyzing a value of a first byte for said frame beginning indicator, wherein said first byte is located one byte after said end byte;
code, executable responsive to finding said frame beginning indicator value, for confirming validity of another length byte content;
code, executable responsive to confirmation and prior to said transmitting of the media stream from the one of the seek point and the new seek point, for increasing a confidence level of said code for assuming; and
code, executable responsive to a negative result from the execution of one of said code for analyzing and said code for confirming:
for executing the code for said selecting of a new seek point on the media stream;
for moving to said new seek point on said media stream; and
for re-executing said code for testing, said code for verifying, and said code for assuming for said new seek point.

11. The computer program product of claim 10 further comprising:
code for focusing on a byte located at said confirmed another length byte content from one of said seek point and said new seek point;
code for evaluating said byte content as a pointer; and
code, executable responsive to said pointer pointing to one of said seek point and said new seek point and prior to said transmitting of the media stream from the one of the seek point and the new seek point, for increasing a confidence level of said assuming.

12. The computer program product of claim 11 further comprising:
responsive to a failure of said pointer pointing to one of said seek point and said new seek point, executing the code for said selecting of a new seek point on the media stream, said code for moving and said code for re-executing said code for testing, said code for verifying, and said code for assuming for said new seek point.

13. The computer program product of claim 9 further comprising:
code for receiving said seek point from a user viewing said media stream.

14. The computer program product of claim 9 wherein said quantum search comprises a Grover's algorithm search.

15. The computer program product of claim 9 further comprising:
code for discovering said media stream is incomplete at said valid frame length;
code, executable responsive to said discovery, for executing the code for said selecting of a new seek point on the media stream, said code for moving and said code for repeating said code for testing, said code for verifying, and said code for assuming for said new seek point.

16. The computer program product of claim 9 further comprising:

code for focusing on a byte located at said valid frame length from one of said seek point and said new seek point;

code for evaluating a content of a next byte after said byte; and code, executable responsive to said next byte equaling said frame beginning indicator value and prior to said transmitting of the media stream from the one of the seek point and the new seek point, for increasing a confidence level of said code for assuming.

17. A system comprising:

a storage device; and a processor communicatively coupled to the storage device, the processor configured to perform operations comprising:

comparing a seek point on a streaming media file to a plurality of frame beginning tags;

responsive to the comparing finding a match, validating a length value in a byte found in a location known to contain a frame length;

responsive to the validating finding the valid length, increasing a confidence level that the seek point is the frame beginning;

responsive to one of the comparing not finding the match, and the validating not finding the valid length:

selecting a new seek point on the streaming media file using a search algorithm that is faster than sequentially searching each individual byte in the media stream, wherein the search algorithm comprises one of a binary search, an interpolation search and a quantum search; and re-executing the comparing, the validating, and the increasing for the new seek point;

moving to another byte located at the frame length from one of the seek point, and the new seek point;

evaluating a pointer to a memory location identified by the other byte content; and responsive to the pointer pointing to one of the seek point and the new seek point:

further increasing the confidence level; and then transmitting the media stream from the one of the seek point and the new seek point; and responsive to the pointer not pointing to one of the seek point and the new seek point, executing the selecting and the re-executing for the new seek point.

18. The system of claim 17, wherein the processor is further configured to perform operations comprising:

responsive to the validating operation validating the frame length, moving to an end byte located at the frame length from one of the seek point, and the new seek point; and comparing a first byte to the plurality of frame beginning tags, wherein the first byte is located one byte after the end byte;

responsive to the comparing the first byte finding a new match, confirming validity of a length byte located in a known position relative to the first byte;

responsive to the confirming, further increasing the confidence level prior to said transmitting of the media stream from the one of the seek point and the new seek point; and responsive to one of the comparing of the first byte not finding the new match and the confirming not finding the valid length byte, executing the selection and the re-executing for the new seek point.

19. The system of claim 18, wherein the processor is further configured to perform operations comprising:

moving to a new byte located at a distance disclosed in the confirmed length byte from one of the seek point, and the new seek point;

evaluating a pointer to a memory position identified by the new byte content; and additionally increasing the confidence level responsive to the pointer pointing to one of the seek point and the new seek point, prior to said transmitting of the media stream from the one of the seek point and the new seek point.

20. The system of claim 19, wherein the processor is further configured to perform operations comprising:

responsive to the pointer not pointing to one of the seek point, and the new seek point, executing the selection and the re-executing for the new seek point.

21. The system of claim 17, wherein the processor is further configured to perform operations comprising:

receiving the seek point from a user viewing the streaming media file.

22. The system of claim 17, wherein the quantum search comprises a Grover's algorithm search.

23. The system of claim 17, wherein the processor is further configured to perform operations comprising:

responsive to determining the streaming media file is incomplete at the valid frame length, executing the selecting and the re-executing for the new seek point.

24. The system of claim 17, wherein the processor is further configured to perform operations comprising:

moving to another byte located at the valid frame length from one of the seek point, and the new seek point;

evaluating a content of a next byte after the another byte; and further increasing the confidence level responsive to the next byte equaling one of the plurality of frame beginning tags, prior to said transmitting of the media stream from the one of the seek point and the new seek point.

* * * * *